(12) United States Patent
Herloski et al.

(10) Patent No.: US 9,578,209 B2
(45) Date of Patent: Feb. 21, 2017

(54) DUAL-USE FULL-WIDTH ARRAY AND METHODS FOR USAGE THEREOF

(71) Applicant: XEROX CORPORATION, Norwalk, CT (US)

(72) Inventors: Robert P. Herloski, Webster, NY (US); Stuart A. Schweid, Pittsford, NY (US); Michael B. Monahan, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 134 days.

(21) Appl. No.: 14/698,216

(22) Filed: Apr. 28, 2015

(65) Prior Publication Data
US 2016/0323480 A1 Nov. 3, 2016

(51) Int. Cl.
| | |
|---|---|
| G01N 21/25 | (2006.01) |
| H04N 1/60 | (2006.01) |
| H04N 1/04 | (2006.01) |
| H04N 1/32 | (2006.01) |
| H04N 1/195 | (2006.01) |

(52) U.S. Cl.
CPC ............ *H04N 1/603* (2013.01); *H04N 1/0408* (2013.01); *H04N 1/195* (2013.01); *H04N 1/32561* (2013.01); *H04N 2201/0094* (2013.01)

(58) Field of Classification Search
CPC .............. H04N 1/60; H04N 1/04; H04N 1/32; H04N 1/195; G01J 3/02; G01J 3/46; G01J 3/50; G01J 3/51
See application file for complete search history.

(56) References Cited

U.S. PATENT DOCUMENTS

| | | | |
|---|---|---|---|
| 6,680,748 B1 * | 1/2004 | Monti | H04N 3/155 348/143 |
| 6,975,949 B2 | 12/2005 | Mestha et al. | |
| 8,203,769 B2 | 6/2012 | Herloski et al. | |
| 8,368,002 B2 | 2/2013 | Hosier et al. | |

OTHER PUBLICATIONS

Pixelteq, "Micro-Patterned Optical Filters", Presented at SPIE Optics + Photonics 2013, http://a8859ac08703feae2ef0-3c64237a4c774bc09c139d4dc157b552.r26.cf2.rackcdn.com/Patterned-Coatings-1.0.0.pdf, pp. 1-2.

* cited by examiner

*Primary Examiner* — Abdullahi Nur
(74) *Attorney, Agent, or Firm* — MH2 Technology Law Group LLP

(57) ABSTRACT

The present disclosure relates to systems and computer-implemented methods for obtaining both high-resolution red-green-blue (RGB) data and other data of an image-bearing surface using a single sensor array. The technique includes obtaining, using a sensor array configured to obtain measurements of M≥4 different spectral sensitivity responses per output pixel at low resolution, spectrophotometric data representing a plurality of output pixels representing the image-bearing surface, determining, using at least one electronic processor and based on the spectrophotometric data, high-resolution RGB data representing the image-bearing surface, determining, using at least one electronic processor and based on the spectrophotometric data, additional data representing a plurality of output pixels representing the image-bearing surface, and outputting the high-resolution RGB data and the additional data.

20 Claims, 2 Drawing Sheets

DUAL-USE FULL-WIDTH ARRAY AND METHODS FOR USAGE THEREOF

FIELD

This disclosure relates generally to image-bearing surface (e.g., document) scanning.

BACKGROUND

A multifunction device might include, for example, both a color printer and a color scanner. More particularly, a multifunction device might include a spectrophotometer scanner, capable of determining spectral sensitivity measurements for a variety of wavelengths, not limited to visible light. In some cases, the scanner might be used to calibrate the printer. In some high-end systems, for example, spectrophotometers are used to characterize the quality of the color output of the system, and to provide a mechanism to adjust the color output characteristics of the system.

A multifunction device might have two relevant, perpendicular dimensions: a process (or slow scan) direction, and a cross-process (or fast scan) direction. The direction in which a document moves through the multifunction device is referred to as process (or slow scan) direction, and the direction in which the sensor or sensors are oriented is referred to as cross-process (or fast scan) direction.

SUMMARY

According to some embodiments, a computer-implemented method of obtaining both high-resolution red-green-blue (RGB) data and other data of an image-bearing surface using a single sensor array is disclosed. The method includes obtaining, using a sensor array configured to obtain measurements of M≥4 different spectral sensitivity responses per output pixel at low resolution, spectrophotometric data representing a plurality of output pixels representing the image-bearing surface, determining, using at least one electronic processor and based on the spectrophotometric data, high-resolution RGB data representing the image-bearing surface, determining, using at least one electronic processor and based on the spectrophotometric data, additional data representing a plurality of output pixels representing the image-bearing surface, and outputting the high-resolution RGB data and the additional data.

Various optional features of the above embodiments include the following. The additional data might include 31-dimensional data at 300×600 dots per inch (dpi). The sensor array might include a plurality of groups of 2×4 sensor elements. The determining additional data might include applying a matrix determined by a Tikhonov regularization process. The additional data might include at least one of XYZ data and L*a*b* data at 600 dots per inch (dpi). The sensor array might include a plurality of groups of 2×2 sensor elements. The determining additional data might include applying a demosaicing process. The low resolution might be 300×600 dots per inch (dpi). The high-resolution might be 600 dots per inch (dpi). Each output pixel might include data obtained by at least four sensor elements.

According to some embodiments, a system for obtaining both high-resolution red-green-blue (RGB) data and other data of an image-bearing surface using a single sensor array is disclosed. The system includes a sensor array configured to obtain measurements of M≥4 different spectral sensitivity responses per output pixel at low resolution, at least one electronic processor communicatively coupled to the sensor array and configured to: obtain spectrophotometric data representing a plurality of output pixels representing the image-bearing surface, determine, based on the spectrophotometric data, high-resolution RGB data representing the image-bearing surface, and determine, based on the spectrophotometric data, additional data representing a plurality of output pixels representing the image-bearing surface, and an interface configured to output the high-resolution RGB data and the additional data.

Various optional features of the above embodiments include the following. The additional data might include 31-dimensional data at 300×600 dots per inch (dpi). The sensor array might include a plurality of groups of 2×4 sensor elements. The at least one electronic processor might be configured to determine the additional data by applying a matrix determined by a Tikhonov regularization process. The additional data might include at least one of XYZ data and L*a*b* data at 600 dots per inch (dpi). The sensor array might include a plurality of groups of 2×2 sensor elements. The at least one electronic processor might be configured to determine the additional data by applying a demosaicing process. The low resolution might be 300×600 dots per inch (dpi). The high-resolution might be 600 dots per inch (dpi). Each output pixel might include data obtained by at least four sensor elements.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
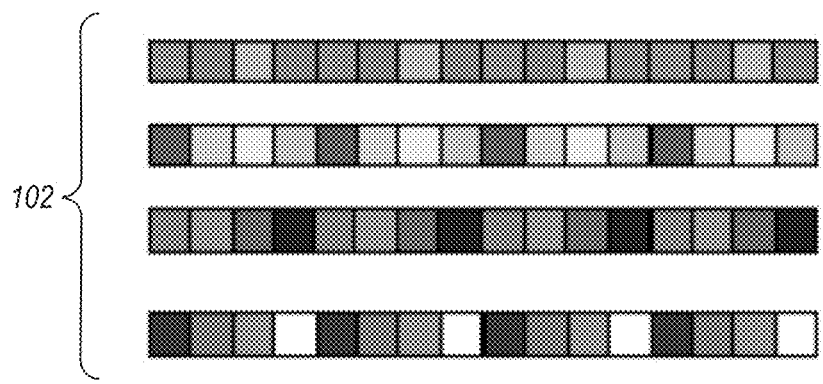
FIG. 1 is a schematic diagram of a portion of a 4×4 sensor array.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention might be practiced. These embodiments are described in sufficient detail to enable those skilled in the art to practice the invention and it is to be understood that other embodiments might be utilized and that changes might be made without departing from the scope of the invention. The following description is, therefore, merely exemplary.

Typical linear color sensors have three channels (e.g., red, blue and green, or "RGB") at full spatial resolution (e.g., 600 dots per inch, or "dpi"). For spectrophotometric data, typically 31 or so measurements using narrow spectral bandpass filters are made at any particular location. For some applications, such as those where all colors are produced from a limited set of primaries (e.g., 4-6), a reasonably accurate spectrophotometric estimation, assuming a particular illuminant, can be obtained from approximately eight spectral band measurements. Thus, in multi-function devices that utilize four inks such as cyan, magenta, yellow, and black, for example, any printed color might be represented as a weighted linear combination of no more than eight spectral response measurements. These measurements might be obtained using either a set of bandpass sensors in conjunction with a white light illuminator, or a set of bandpass LED illuminators with a monochromatic (i.e., equal spectral sensitivity) sensor. For example, one can use micropatterned filters on a three- or four-row sensor to get spatially resolved spectrophotometric data, though at a reduced resolution (e.g., 75 dpi with an 8×4 array). In the past, one could not get both hi res RGB data and high-resolution spectrophotometric data with the same device.

Some embodiments provide a dual-use sensor coupled to processing logic configured to convert a spatially-resolved array of spectrophotometric data into high resolution red-green-blue ("RGB") data, and provide either or both of spectrophotometric and RGB data as needed, using the same device. Given that, for many applications, only eight samples are needed to reasonably estimate spectrophotometric data, one could use a sensor having two columns (oriented along the process direction) and four rows (oriented along the cross-process direction), that is, in a 2×4 architecture, described in detail further below. For a 600 dpi sensor, this can generate full eight-sample spectrophotometric data at 300 dpi. Alternatively, the 2×4 data for every 300 dpi could be converted, via a Bayer-type demosaicing, to two interpolated 600 dpi RGB samples. In other words, one could select either eight-sample spectrophotometric data at 300 dpi (say, for system spatial color characterization), or demosaiced interpolated RGB data at 600 dpi, with the same device, by just transforming the eight-sample spectrophotometric data captured. These and other embodiments are described in detail below.

FIG. 1 is a schematic diagram of a portion of a 4×4 sensor array 102. Sensor array 102 might be a full width array (FWA), for example. Note that sensor array 102 is characterized as "4×4" because it comprises repeating array units of four columns of four rows. A full width array might be a sensor that extends, by repetition of such array units, substantially an entire width (perpendicular to a direction of motion) of a moving image bearing surface. Thus, the portion of sensor array 102 depicted in FIG. 1 is partial; in an embodiment, sensor array 102 might extend to the left and/or right by the inclusion of additional array units, such that it extends substantially the entire width of a cross-process direction. In some embodiments, sensor array 102 might include a plurality of sensor elements, depicted in FIG. 1 as squares, equally spaced at intervals (e.g., every ¹⁄₆₀₀th inch for 600 dpi) in the cross-process (or fast scan) direction. Sensor array 102 might include or be included on a sensor chip.

Physically, each square of input pixel array 102 represents a single sensor element configured to obtain a particular spectral sensitivity response value representing a portion of an image-bearing surface. This is represented in FIG. 1 using different shading for different sensor spectral sensitivities. Each linear sensor of a sensor element of sensor array 102 might include, by way of non-limiting example, a contact image sensor, an element of a CMOS array of sensors, or an element of a charge-coupled device (CCD) array of sensors. Further, each square represents a sensor element that includes a physical configuration of a spectral filter and a linear sensor.

Each spectral filter of a given sensor element might be an optical narrow-bandpass coated glass filter, for example. A single spectral filter might cover a plurality of squares (sensor elements) in a row of sensor array 102. In such embodiments, each spectral filter might achieve its spectral performance using a film (e.g., a bandpass coating) that varies in thickness across its face. In some embodiments, each spectral filter includes three different layers, namely, a bandpass coating, a substrate, and a blocker coating, through which light reflected off the image-bearing surface is configured to pass.

Each sensor element of sensor array 102 produces an output voltage representing a spectral sensitivity response. The spectral sensitivity response might be conceptualized and represented as a mathematical overlap integral of four terms, namely, a spectral reflectivity of a respective portion of the image-bearing surface, a transmission profile of the respective spectral filter, a wavelength profile of a respective spectral illumination element, and a responsivity of the unfiltered sensor of the sensor element.

Figure 2:
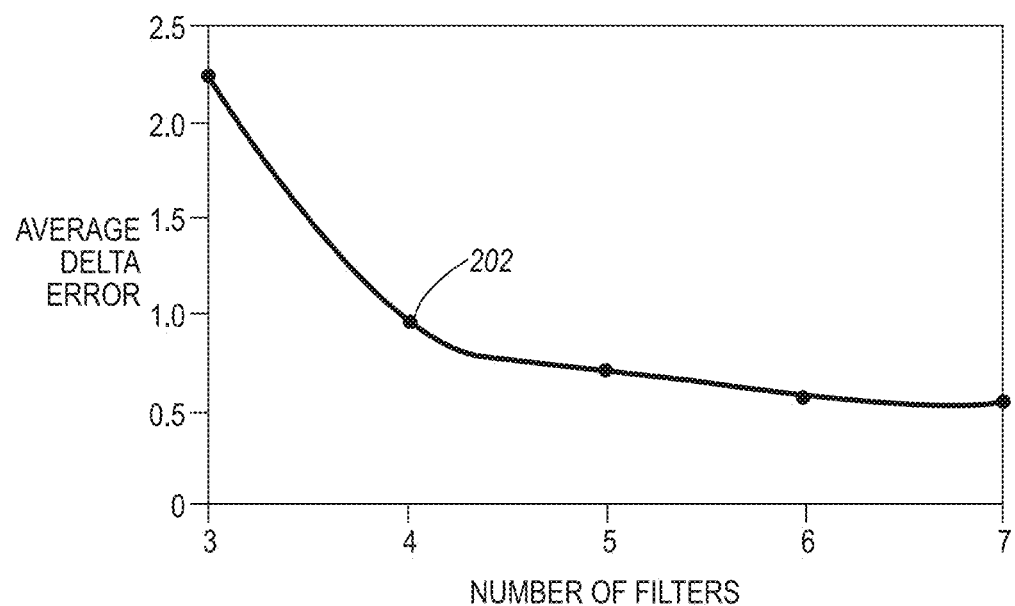
FIG. 2 is a graph representing scanning accuracy, assuming a single illuminant, per number of spectral sensitivity response filters.

FIG. 2 is a graph representing scanning color accuracy, assuming a single illuminant, per number of spectral sensitivity response sensors used to process a single portion of an image-bearing document. In FIG. 2, the x-axis depicts number of filters, and the y-axis depicts average ΔE error (a known metric of color difference in the L*a*b* color space, known in the art). In general, each sensor corresponds to a filter that defines in part the spectral response measurement made by the sensor. Thus, FIG. 2 can be considered to chart number of filters used on the same portion of an image-bearing document versus average ΔE error.

As depicted in FIG. 2, an inflection point 202 appears near four on the x-axis. Thus, a point of diminishing returns occurs around four sensors for the measurement of L*a*b* directly, assuming a single illuminant. Accordingly, some embodiments utilize a sensor array that has array units with columns of four different sensors. In particular, some embodiments utilize 4×4 array units. Note that embodiments are not limited to four sensors per image-bearing surface location; some embodiments utilize 2×2 array units. Other array units might be used.

Figure 3:
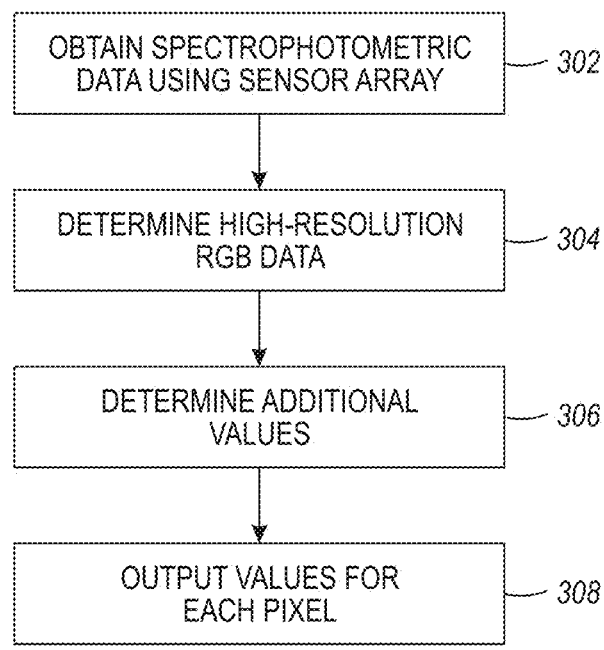
FIG. 3 is a flowchart representing a method according to some embodiments.

FIG. 3 is a flowchart representing a method according to some embodiments. The method might be implemented using a full-width array of repeating sensor blocks as disclosed, e.g., installed in a multifunction device. The blocks might repeat across the entire width of the cross-process direction. The sensor array may include sensors configured to obtain spectral response information at 600 dpi. The method of FIG. 3 is described in reference to two separate example embodiments, which might each utilize a sensor array as described, but with variations as stated.

Per a first example, the method may be implemented using a device equipped with a 2×4 full-width sensor array, that is, a full-width sensor array having repeating 2×4 sensor blocks. A first column of each sensor block might include sensors with a spectral response centered at 410, 490, 570, and 650 nm. A second column of each sensor block might include sensors with a spectral response centered at 450, 530, 610, and 690 nm. According to some embodiments, the spectrum of electromagnetic radiation from 390 nm to 760 nm is divided into seven equal segments (on a logarithmic scale), every other value is used for one column in the sensor block, and the remaining values are used for the other column in the sensor block.

Per a second example, the method might be implemented using a device that includes a 2×2 array, that is, a full-width array equipped with repeating blocks of 2×2 sensor arrays.

Each sensor block might include sensors with spectral responses centered at red, blue, green and infrared wavelengths, e.g., 450, 550, 650, and 750 nm.

At block 302, the method obtains spectrophotometric data using the respective sensor array. This might occur when the associated device scans a document or other image-bearing surface, for example. In general, the actions of this block occur when the associated device uses its respective sensor array to scan an image-bearing surface.

Per the first example, at block 302 the method obtains four spectral sensitivity responses for each 1/600-th of an inch portion of the image-bearing surface using the 2×4 sensor blocks of the sensor array. Because the process direction is parallel to the columns of the sensor blocks, each 1/600-th-inch location on the surface-bearing image is scanned by four sensors, each with a different spectral sensitivity. That is, because during a scanning process the image-bearing surface passes over the sensor array in the direction of the sensor block columns, each sensor in a column gets to scan the same location. Thus, per the first example, block 302 of the method obtains four spectral sensitivity responses at 600 dpi resolution for a full-width row of the image-bearing surface. Of course, this process repeats for each row as the image-bearing surface proceeds along the process direction, such that the method obtains four spectral sensitivity responses for each 1/600-th of an inch along each row of the image-bearing surface. Because the columns of the 2×4 sensor block have independent sensors, adjacent portions of the image-bearing surface might be subjected to different independent spectral sensitivity measurements.

Per the second example, at block 302 the method obtains two spectral sensitivity responses for each 1/600-th of an inch portion of the image-bearing surface along the cross-process direction using the 2×2 sensor blocks of the respective sensor array. Like the description of the first example, the image-bearing surface passes a scanner array in the direction of the sensor block columns, that is, in the process direction. Per the second example, block 302 obtains two spectral sensitivity responses at 600 dpi for each row of the image-bearing surface. Note that adjacent portions of the image-bearing surface might have different spectral sensitivity measurements made, e.g., one portion might be measured using red and blue bandpass filters, and the next portion might be measured using infrared and green bandpass filters.

At block 304, the method determines high-resolution RGB data. The high resolution data might reflect 600 dpi resolution and be represented in any format for presenting, transferring or processing RGB data.

Per the first example, at block 304 the method determines the high-resolution (e.g., 600 dpi) RGB data by directly transforming the spectral sensitivity responses at each location (four for each image-bearing surface portion, with adjacent portions potentially being measured for different spectral sensitivity responses, per the configuration of the 2×4 sensor array) using a linear transformation (i.e., a matrix transformation). No spatial interpolation is required in this embodiment as only the four spectral responses are sufficient to provide an accurate RGB estimate. Each unique column of the sensory array requires a unique matrix conversion to match its unique set of spectral responses. In this embodiment, two such matrices may be used, as columns consist of one of two possible spectral response sets.

In alternate embodiments of the first example, instead of deriving the high-resolution RGB data from the high-resolution data obtained at block 302 at every pixel, the method instead derives the high-resolution RGB data from the full estimated spectra (i.e., one form of the additional values) determined per block 306, below. In such embodiments, the method may apply a Tikhonov regularization process to determine a matrix that transforms the data values acquired at block 302 as described below in reference to block 306. Using a different apriori matrix transformation, the full spectral response is transformed to accurately estimate a typical scanner RGB output followed by an interpolation process (e.g., a linear/bicubic interpolation) to up-sample the 300×600 dpi data to a full 600 dpi; the two matrix transformations may be combined into single matrix transformation to transform the measured responses to scanner-type RGB without an intermediary state.

Per the second example, at block 304, the method determines high-resolution (e.g., 600 dpi) RGB data by applying a spatial interpolation process to the data acquired at block 302. The spatial interpolation process might be a Bayer-type process, for example.

At block 306, the method determines additional values. These additional value represent various additional formats for representing scanned images. The additional values might be derived from previously-obtained values as described presently in reference to the two ongoing example embodiments.

Per the first example, at block 306 the method might apply a matrix determined by a Tikhonov regularization process to the data acquired at block 302 in order to obtain, e.g., 31-dimensional data at 300×600 dpi. In more detail, eight samples are typically sufficient to characterize colorimetric performance of a printer with respect to a single illuminant, given that any 4 or 5 ink/toner printer has on the order of 7 to 8 or so independent degrees of freedom colorimetrically. (In such a printer, any printed color might be represented as a weighted linear combination of the four colors.) If the sensor pixel resolution is 600 dpi, this sensor can be used to generate eight-sample spectrophotometric data at 300 dpi. Using a spatially resolved training table as part of a Tikhonov regularization process, the process might determine, as additional data, fully spatially-resolved colorimetric system performance data at 300×600 dpi. Note that a single "output pixel" at 300×600 dpi represents the area on the image-bearing surface corresponding to two sensor elements of the sensor array. By processing the resulting data using an interpolation technique (e.g., a linear or cubic interpolation), these eight samples at 300×600 dpi might be converted to two interpolated RGB samples at 600×600 dpi, to produce the data at block 304 using an alternate technique.

Per the second example, at block 306, the method might apply an interpolation process to the data obtained at block 302 to obtain data in various other formats, e.g., XYZ and/or L*a*b*. As few as four samples (e.g., attainable via a 2×2 sensor array) can provide adequate ΔE performance. This observation might be leveraged to slightly modify the Bayer filter configuration of R,G,B,G (two greens) to one each of R,G,B,IR (where infrared is the 4th channel). This provides near-identical spatial resolution performance in standard RGB mode, while significantly improving XYZ and L*a*b* estimation. This greatly enhances L*a*b* (and XYZ) estimation as compared to the standard, prior art Bayer configuration.

At block 308, the method outputs values for each pixel. Note that different outputs might have a different number of pixel representations, e.g., a 600 dpi output might account for twice as many pixels as a 300Δ600 dpi output. The pixels represented by such data are referred to as "output pixels". The method might output the high-resolution RGB data obtained at block 304, the additional data obtained at block 306, or both.

The output of block 308 might be made to a separate device or internally to a different portion of the same device that includes the sensor array. Thus, the output might be sent over a network, such as the internet, or conveyed to a process internal to a multifunction device, such as a calibration process. Regardless as to the type of output, an appropriate interface (e.g., electronic connection or set of connections) might be used to convey the data.

Figure 4:
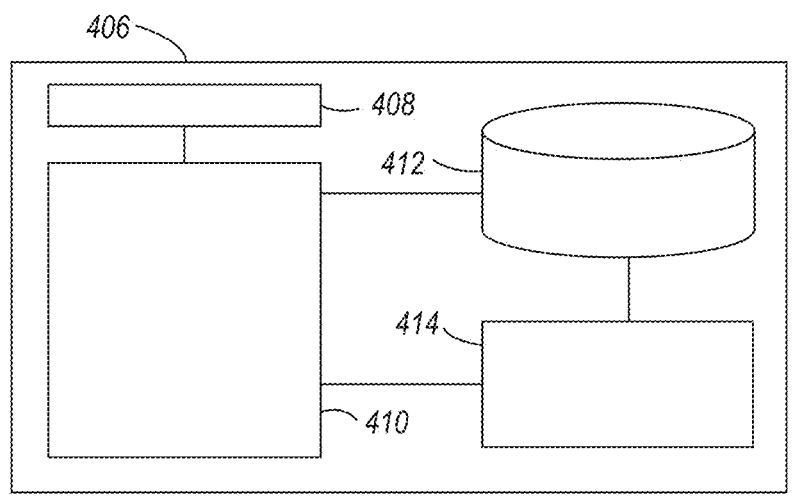
FIG. 4 is a schematic diagram of a multi-function device according to some embodiments.

FIG. 4 is a schematic diagram of a multi-function device according to some embodiments. The device of FIG. 4 might be used to implement the disclosed techniques in whole or in part. In particular, FIG. 4 illustrates various hardware, software, and other resources that can be used for methods according to disclosed examples. In examples as shown, apparatus 406 can include a processor 410 coupled to a random access memory operating under control of or in conjunction with an operating system. The processor 410 in examples can be incorporated in one or more servers, clusters, or other computers or hardware resources, or can be implemented using cloud-based resources. Processor 410 can communicate with the data store 412, such as a database stored on a local hard drive or drive array, to access or store data. Processor 410 is also coupled to sensor array 408, e.g., a full-width sensor array as disclosed herein. Processor 410 is further coupled to graphics co-processor 414, which can parallelize operations as described herein. Processor 410 can, in general, be programmed or configured to execute control logic and control scanning operations. Other configurations of apparatus 406, associated network connections, and other hardware, software, and resources are possible.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer-implemented method of obtaining both high-resolution red-green-blue (RGB) data and other data of an image-bearing surface using a single sensor array, the method comprising:
obtaining, using a single sensor array configured to obtain measurements M, where M is a measurement of different spectral sensitivity responses per output pixel at low resolution, spectrophotometric data representing a plurality of output pixels representing the image-bearing surface, and wherein M≥4; determining, using at least one electronic processor and based on the spectrophotometric data, high-resolution RGB data representing the image-bearing surface; determining, using at least one electronic processor and based on the spectrophotometric data, additional data representing a plurality of output pixels representing the image-bearing surface; and outputting the high-resolution RGB data and the additional data.

2. The method of claim 1, wherein the additional data comprises 31-dimensional data at 300×600 dots per inch (dpi).

3. The method of claim 2, wherein the sensor array comprises a plurality of groups of 2×4 sensor elements.

4. The method of claim 2, wherein the determining additional data comprises applying a matrix determined by a Tikhonov regularization process.

5. The method of claim 1, wherein the additional data comprises at least one of XYZ data and L*a*b* data at 600 dots per inch (dpi).

6. The method of claim 5, wherein the sensor array comprises a plurality of groups of 2×2 sensor elements.

7. The method of claim 5, wherein the determining additional data comprises applying a demosaicing process.

8. The method of claim 1, wherein the low resolution is 300×600 dots per inch (dpi).

9. The method of claim 1, wherein the high-resolution is 600 dots per inch (dpi).

10. The method of claim 1, wherein each output pixel comprises data obtained by at least four sensor elements.

11. A system for obtaining both high-resolution red-green-blue (RGB) data and other data of an image-bearing surface using a single sensor array, the system comprising: a single sensor array configured to obtain measurements of M, wherein M is a measurement of different spectral sensitivity responses per output pixel at low resolution, and wherein M≥4; at least one electronic processor communicatively coupled to the sensor array and configured to: obtain spectrophotometric data representing a plurality of output pixels representing the image-bearing surface, determine, based on the spectrophotometric data, high-resolution RGB data representing the image-bearing surface, and determine, based on the spectrophotometric data, additional data representing a plurality of output pixels representing the image-bearing surface; and an interface configured to output the high-resolution RGB data and the additional data.

12. The system of claim 11, wherein the additional data comprises 31-dimensional data at 300×600 dots per inch (dpi).

13. The system of claim 12, wherein the sensor array comprises a plurality of groups of 2×4 sensor elements.

14. The system of claim 12, wherein the at least one electronic processor is configured to determine the additional data by applying a matrix determined by a Tikhonov regularization process.

15. The system of claim 11, wherein the additional data comprises at least one of XYZ data and L*a*b* data at 600 dots per inch (dpi).

16. The system of claim 15, wherein the sensor array comprises a plurality of groups of 2×2 sensor elements.

17. The system of claim 15, wherein the at least one electronic processor is configured to determine the additional data by applying a demosaicing process.

18. The system of claim 11, wherein the low resolution is 300×600 dots per inch (dpi).

19. The system of claim 11, wherein the high-resolution is 600 dots per inch (dpi).

20. The system of claim 11, wherein each output pixel comprises data obtained by at least four sensor elements.

* * * * *